(12) United States Patent
Brennan et al.

(10) Patent No.: US 7,333,933 B2
(45) Date of Patent: Feb. 19, 2008

(54) SPEECH BASED STATUS AND CONTROL USER INTERFACE CUSTOMISABLE BY THE USER

(75) Inventors: Paul Michael Brennan, Toronto (CA); Jason Adelman, Toronto (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 956 days.

(21) Appl. No.: 09/739,392

(22) Filed: Dec. 19, 2000

(65) Prior Publication Data

US 2002/0077829 A1 Jun. 20, 2002

(51) Int. Cl.
*G10L 15/28* (2006.01)
(52) U.S. Cl. .................. 704/270.1; 704/231; 379/88.03
(58) Field of Classification Search ...................... None
See application file for complete search history.

(56) References Cited

U.S. PATENT DOCUMENTS

| | | | | |
|---|---|---|---|---|
| 4,785,408 A | * | 11/1988 | Britton et al. | 704/270 |
| 5,115,501 A | * | 5/1992 | Kerr | 707/9 |
| 5,220,675 A | * | 6/1993 | Padawer et al. | 715/826 |
| 5,835,571 A | * | 11/1998 | Johnson | 379/88.01 |
| 5,915,001 A | * | 6/1999 | Uppaluru | 379/88.22 |
| 5,924,070 A | * | 7/1999 | Ittycheriah et al. | 704/275 |
| 5,974,413 A | * | 10/1999 | Beauregard et al. | 707/6 |
| 6,460,036 B1 | * | 10/2002 | Herz | 707/10 |
| 6,487,277 B2 | * | 11/2002 | Beyda et al. | 379/88.01 |

FOREIGN PATENT DOCUMENTS

WO WO 99/14928 * 3/1999 ............. 379/88.03

* cited by examiner

*Primary Examiner*—Donald L. Storm
(74) *Attorney, Agent, or Firm*—Jeffrey M. Measures; Borden Ladner Gervais LLP (57) ABSTRACT

The present invention provides a means for an end user to customize a speech-based user interface, such as those used in status and control for such applications as messaging, unified communications, automobile control, and many others. The invention consists of two major components: a graphical configuration component, and a run-time component. The graphical configuration component allows a user to quickly and efficiently: specify the information they wish to be included in spoken summaries; restructure command menus or vocabulary structures to meet their personal requirements, moving commonly-used commands to the "top" of a hierarchy or vocabulary structure, and rarely-used commands to the bottom layers; create additional commands to access information relating to functions external to the system, e.g. access data from the web, or control another device or system, via the web; and save the customization for use by the run-time program. The run time program is embedded into the speech user interface module of the system, and effectively executes the customized speech based user interface. Some existing speech user interface modules may already be "data driven", thus providing an excellent foundation for implementing the invention.

21 Claims, 6 Drawing Sheets

PRIOR ART

SPEECH BASED STATUS AND CONTROL USER INTERFACE CUSTOMISABLE BY THE USER

FIELD OF THE INVENTION

The present invention relates broadly to speech-based user interfaces providing user access to status and control functions in a variety of applications, examples of which include: telephone access to messages or communications features; and hands-free speech-based use of control systems such as those in automobiles or homes.

BACKGROUND OF THE INVENTION

Speech-based user interfaces are employed in a variety of applications. In such user interfaces, the system's output to the user is spoken and audible, rather than displayed. User input to these systems may also be spoken, recognized by automatic speech recognition (ASR) technologies, or by key input, most commonly dual-tone multi-frequency (DTMF) keys on telephones.

Figure 1:
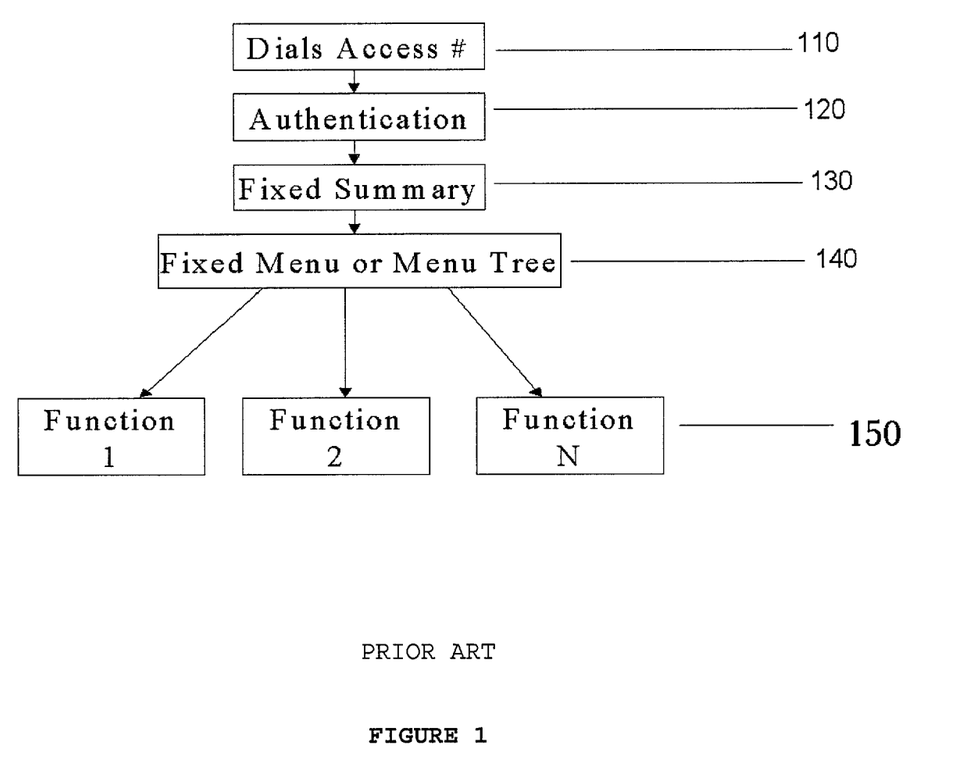
FIG. 1 illustrates the steps involved in the use of a prior art speech-based interface.

One of the most common and widely used speech-based user interface is the telephone-based access to voice messages that millions of persons use every day. In such a system, a user calls into a voice mail system, gains access to the system, and hears a status message describing the current state of messages in the mailbox. (This status message will be referred to hereinafter by the term "summary".) The user is then offered a fixed set of functions. FIG. 1 shows typical steps involved in such an interaction in prior art systems.

FIG. 1 illustrates the steps involved in the use of a prior art speech-based interface, such as that used in a voice mail system. In accessing step 110, a user enters the system by dialing an access number. In authentication step 120, the system performs user authentication by prompting the user for a user id and password combination, or some other login procedure. Following successful authentication, step 130 consists of presenting a fixed, pre-programmed summary to the user that offers information regarding the status of the messages in the user's mailbox. Next, in step 140, a fixed menu of system functions that are available to the user is presented. This menu may contain nested menus, each offering groups of functions presented hierarchically. The user may then, in step 150, access their choice of system functions offered in the fixed menu.

Other prior art speech-based systems are intended primarily for use in a hands free/eyes free environment, such as an automobile. In such as system, a user would activate the car, hear a status message, and have spoken control of automobile functions, such as radio, climate control, navigation systems, etc. via the speech-based system.

Both these messaging and automobile prior art systems have a major element in common. Although both were formerly standalone, isolated systems, current implementations of such systems are now in communication with the rest of the world via the internet.

The messaging system has evolved from simple voice messages, to unified messaging (including e-mail and facsimile, and soon to include video), to unified communications, where the user not only accesses their messages, but initiates calls, manages their schedule, and has access to a voice browser for the world wide web.

The automobile system, while less mature in its development, is already evolving, with functionality being available that permits a driver to access web-based information without taking their hands off the steering wheel.

Both of these exemplary prior art systems have another element in common. Both of the user interfaces present summary information and offer functions, each of which is programmed in advance by the manufacturer. The summary information is based on a standard template. The functions available within a standard voice menu are based on a pre-set hierarchy or voice command vocabulary structure.

As the wealth of potential information and available functions increases, some users' needs cease to be appropriately addressed by these prior art solutions. For instance, the pre-defined summary may include information the user does not desire, and may not include other information that is important to the user. Also, each user tends to use only a subset of these numerous available functions. Nevertheless, each user is forced to unnecessarily navigate amongst the "clutter" to access those functions that are used most often. Furthermore, there is no ability to create new functions, such as those that would retrieve specific elements of information from the web that are of interest to the particular user.

While customization exists in other domains (e.g. web services and PC-based GUI applications), it has long been held that customization was impractical for speech interfaces, given their very limited nature. However, in view of recent expanded uses of speech-based interfaces, it would be desirable to have a system and method that would allow for user customization of these interfaces, thereby facilitating a user's experience with the systems that they control.

One particular prior art system exists that attempts to address some of these drawbacks. On Apr. 10, 2000, in a company press release, Tellme Networks Inc. of Mountainview, Calif. announced a telephone-accessed service named Tellme™ which, at that time, was accessible via a toll-free number and customizable either by telephone or on the www.tellme.com web site. The Tellme service allows a user to reorder a set of preset elements in an information summary, and to select the specific data items that are used to quantify those elements. This system only permits a user to select a function from a plurality of available functions. The system does not permit the user to define a new function nor does it permit the user to define a modified version of an existing function. Because of this limitation, the system does not permit the user to modify the contents or presentation of the information summary that is played upon accessing the system. Furthermore, the user cannot customize the interface itself. The present invention seeks to overcome the drawbacks of prior art systems.

SUMMARY OF THE INVENTION

The present invention seeks to provide a means whereby an end user may customize a speech-based user interface, such as those used in status and control for such applications as messaging, unified communications, automobile control, and many others.

The invention consists of two major components: a graphical configuration component, and a run-time component.

The graphical configuration component allows a user to quickly and efficiently: specify the information they wish to be included in spoken summaries; restructure command menus or vocabulary structures to meet their personal requirements, move commonly-used commands to the "top" of a hierarchy or vocabulary structure, and rarely-used commands to the bottom layers; create additional commands to access information or functions external to the system, e.g. access data from the web, or control another device or system, via the web; save the customization for use by the run-time program.

The run time program is embedded into the speech user interface module of the system, and effectively executes the customized speech based user interface. Some existing speech user interface modules may already be "data driven", thus providing an excellent foundation for implementing the invention.

According to one aspect of the invention, there is provided a method of customizing a speech based user interface to an application system by means of an input device, said application system comprising a speech user interface subsystem, a profile database, and application components, the method comprising the steps of: accessing the speech user interface subsystem from an input device; selecting a profile from the profile database for customization; customizing user-defined functions for use within said profile; saving said profile in said profile database of said application system; and providing said profile to said speech based user interface for presentation upon subsequent access by the user.

According to another aspect of the invention, there is provided a method of providing a customized speech based user interface to an application system, said application system comprising a speech user interface subsystem, a profile database, and application components, the method comprising the steps of: receiving an access request from a user; retrieving a customized profile for the user from said database, said customized profile comprising user-defined functions; presenting said user-defined functions via said customized speech based user interface in accordance with said customized profile; and providing access to data elements presented in said user-defined functions.

According to a further aspect of the invention, there is provided a communication system comprising: an input device; an application system; and an audio output device; wherein said application system comprises: customization means permitting customization of a speech based user interface for use with said application system; a profile database; and a speech user interface subsystem.

BRIEF DESCRIPTION OF THE DRAWINGS

Embodiments of the present invention will now be further described, by way of example with reference to the accompanying drawings, in which.

DETAILED DESCRIPTION OF THE INVENTION

In accordance with the present invention, a user may customize the summary that is played upon successful access to the system. In prior art systems, such as the Tellme system described above, this summary was restricted to providing information relating to system-defined functions. Although the user had the ability to select particular desired functions from the list of available functions, the user was not permitted to customize the functions themselves. In contrast, the present invention permits a user to define the functions that are used. Therefore, the user has complete control over the potential contents of these user-defined functions as opposed to the restrictions inherent in the prior art system-defined functions.

Consequently, a user may create, or define, personalized functions in their profile for the speech based user interface. These personalized functions, or rules, may include parameters that define restrictions related to a particular date or time, or any other condition. For example, a user may want the status summary to only play the value of a stock portfolio on Fridays. Alternatively, a user may define a function that will place a special alert in the summary if there are more than 10 unread email messages. Any number of such complex rules may be defined in order that the user may more efficiently use the application system by means of the customized speech based user interface.

In accordance with the present invention, a user may define a function to provide information not only relating to internal elements, such as messages being accessed, but also relating to external information, or elements, such as local weather reports, personalized stock portfolio quotes, or scores from games involving the user's favorite sports teams. Again, these functions are user-defined and not system-defined; therefore, there is no limitation with respect to the function, except that the elements must be available in some manner. These external elements to which the functions relate may be in the form of data, or may be in the form of external control functions that may perform some further operation in order to obtain the desired information. In a preferred embodiment, the user may employ a uniform resource locator (URL) that points to a web page from which the system may access the relevant external information. As such, the user may point to a web page that has already been customized to include relevant information, even if it must be accessed from a particular database. The present invention will be able to extract the information from the web page using a programming tool such as those provided by the xXML language family.

However, the customization available to the user is not limited to customizing the elements in the summary, or to defining new functions or creating new functions.

In some cases, the user may want to customize other aspects of the system. For example, for any text-to-speech functions associated with the system, there may be the option to choose from many different voices, each one having a particular style or attribute, such as: male, female, fast talker, happy, friendly, businesslike, speaking with a particular accent, etc. Obviously, it may also be possible to select a system language for any standard system-related prompts relating to the delivery of services via the speech based user interface. Another example may be, in the case of a unified communications system that is always on, a definition of a default application from among the available applications.

Figure 2:
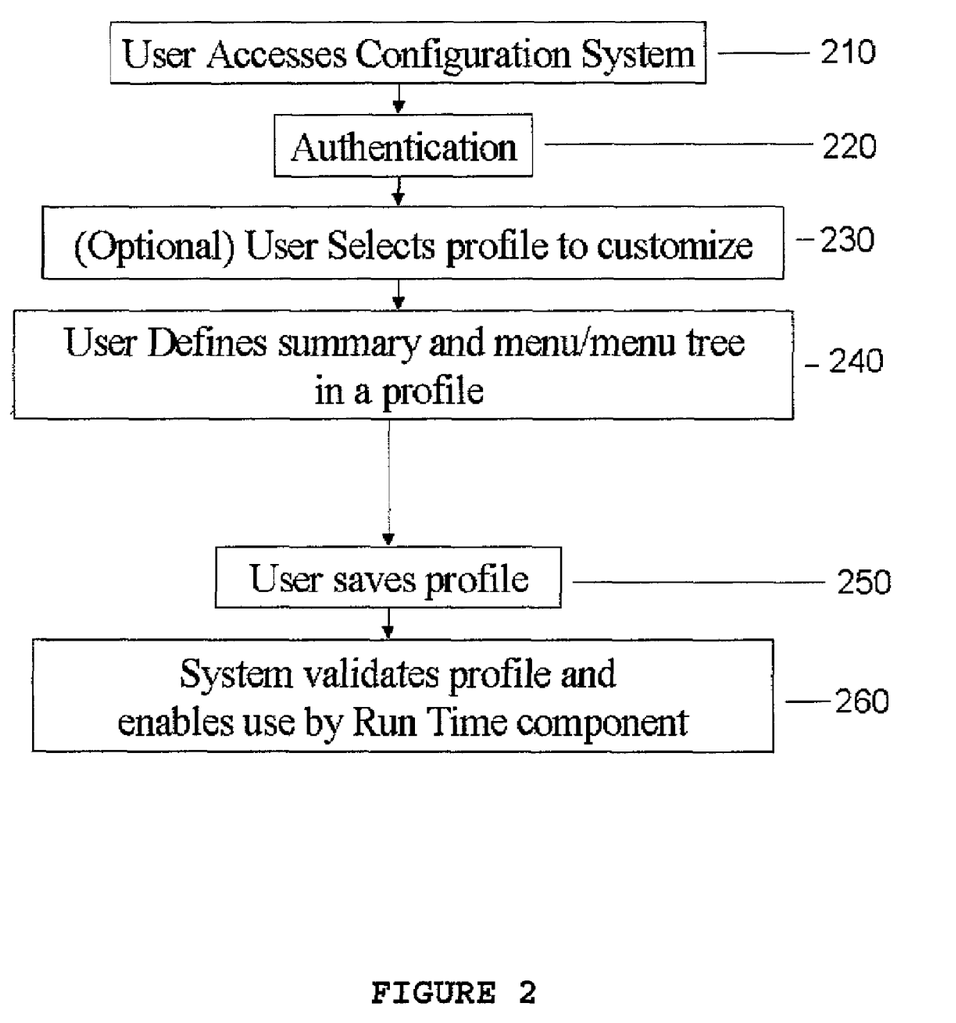
FIG. 2 illustrates the steps involved in the use of a speech-based interface according to a graphical configuration embodiment of the invention.

A user desiring to use the graphical configuration component of the invention would do so in accordance with the steps illustrated in FIG. 2. Similar to the situation in prior art systems, the user accesses the configuration system in step 210 and undergoes an authentication procedure in step 220. However, in step 230, the user is able to select a profile to customize. This profile will be selected from a database that is part of the application system. The selection of the user's profile may be performed automatically based on authentication information, or may be performed as a result of a manual selection by the user. Alternatively, automatic selection may occur if there is only one profile in the database. In step 230, the user's own profile may be the only profile upon which customization may be performed. However, in the case of a system administrator, customization may be performed on the profile of any user on the system. Although the application system may provide any number of possible system applications, for the purposes of this example, a voice mail application will be considered. In step 240, the user performs all actual customization steps, including defining the elements to be included in the summary and those to be included in the menus. This step will be described in further detail with respect to FIG. 4B. In step 250, the user saves the profile into the system. Finally, in step 260, the system validates the profile and provides the customized profile, upon subsequent user accesses to the system, to the run-time embodiment of the present invention.

Figure 3:
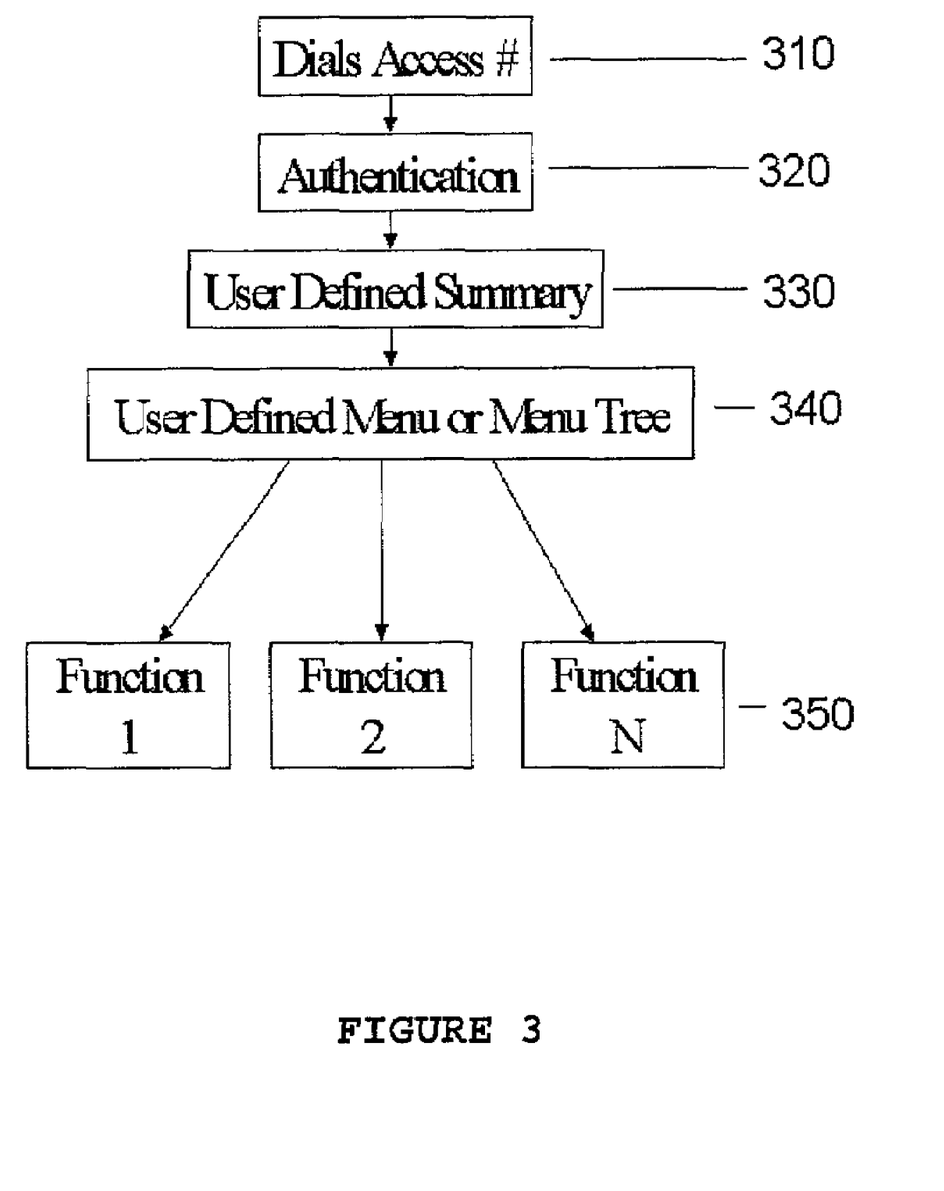
FIG. 3 illustrates the steps involved in the use of a speech-based interface according to a run-time embodiment of the invention.

The use of the customized profile in the run-time component of the instant application is shown in FIG. 3. Again, steps 310 and 320 are similar to previous discussions of such systems wherein step 310 consists of the user dialing an access number and undergoing an authentication process in step 320. In contrast to FIG. 1, in step 330, a user-defined summary is presented to the user based on the information contained in the user's customized profile. Following the presentation of the user-defined summary, in step 340, the user is presented with the customized menu (or set of customized nested menus or menu tree) from which any number of the available functions may be subsequently accessed in step 350. Of course, since this menu information is now based on the user's customized profile, the functions presented first will likely be those that are most often accessed by the user.

Figure 4A:
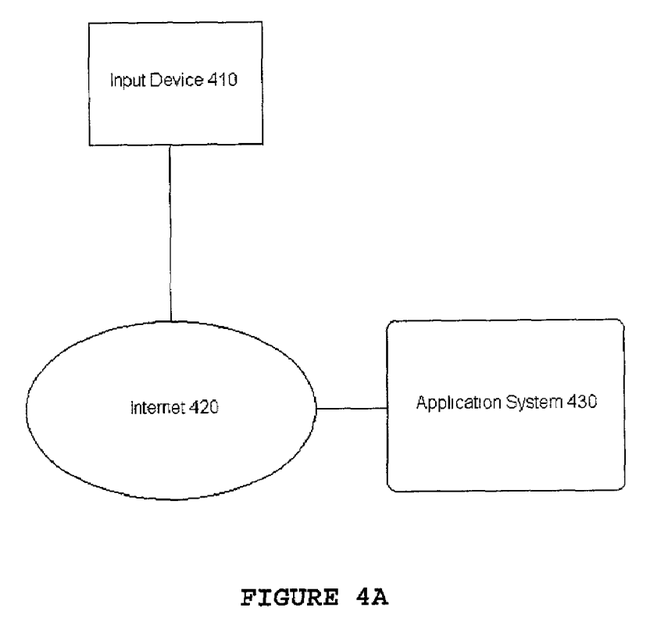
FIG. 4A illustrates a block diagram of a graphical configuration embodiment of the invention.

Turning to FIG. 4A, a system is shown in which the graphical configuration component of the invention may be employed. Input device 410 provides the user with the graphical interface by which the configuration will be performed. The input device 410 is preferably a personal computer, or any other device that can provide sufficient capability to graphically configure application system 430. Communication between the input device 410 and the application system 430 are accomplished via communication means 420. The communication means 420 may be an internal telephone or computer network, a public network such as the internet, or a combination thereof.

In an alternate embodiment according to FIG. 4A, the configuration component may not be restricted to a graphical configuration component. Many other means exist whereby a user may perform such configuration functions. For example, in a system that is equipped with speech recognition capabilities, the input device 410 employed by a user in order to perform customization may be a telephone or any other audio-based device. In such an arrangement, the user might say "Customize" and enter a customization program. This program may permit the user to modify the status summary and/or commands. For instance, the user might have commands to review the list of elements in the summary (e.g. "Number of Messages, Next Appointment, Temperature, Portfolio Value") and change the order or delete or add elements. In an alternate embodiment, the configuration component may be accessible via an interface that accepts dual tone multi frequency (DTMF) keystrokes, much like many existing voice mail systems.

Figure 4B:
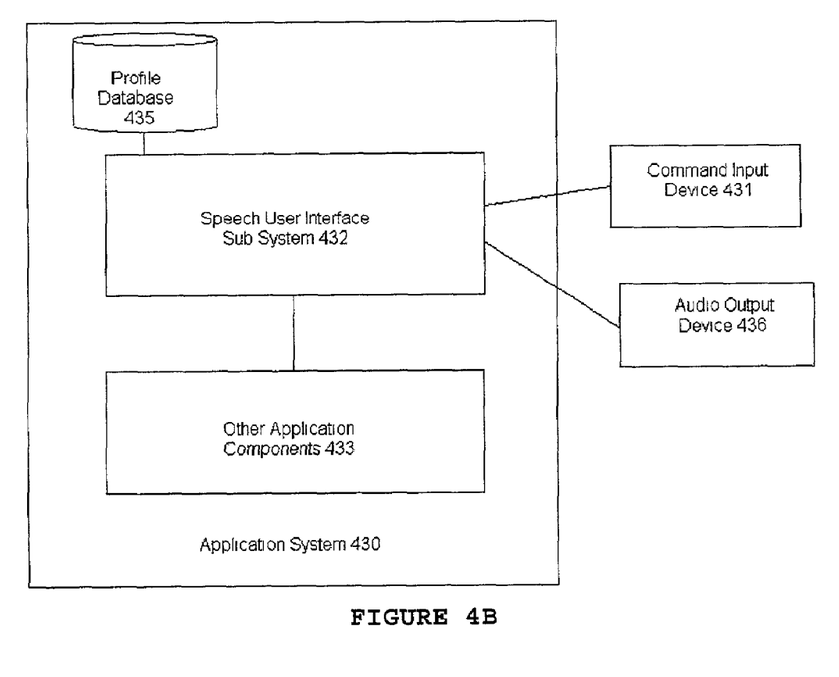
FIG. 4B illustrates a block diagram of a run-time embodiment of the invention.

FIG. 4B illustrates a block diagram of a system wherein the run-time component of the invention is employed. This figure also provides a more detailed view of the application system 430, including its various components. The user employs command input device 431 to access the system. The command input device 431 is preferably a microphone, although other non-speech means may be used, as mentioned previously. This microphone may, for example, be the microphone included in a user's telephone set. The application system 430 will present a user-defined summary that will contain information relevant to that user, both relating to internal application system components (messages) and to external information components (sports scores, stock portfolio quotes, etc), as configured by the user according to the steps in FIG. 2. After having heard the user-defined summary, the user may simply elect to exit the application system, having already obtained the necessary information, such as whether the user's portfolio had dropped below a certain value. If the user elects to access one of the application system functions, an audio command is received via the command input device 431. Speech input/output subsystem 432 interprets the audio command and instructs other application components 433 to execute the desired system function. This system function may be one of many possible functions such as: listen to a voice message, retrieve specific stock portfolio information, retrieve box scores from last night's baseball game, etc. The results of the system function will be sent to the user via audio output device 436. The audio output device 436 is preferably a speaker, and may be the speaker in the user's telephone set.

Figure 5:
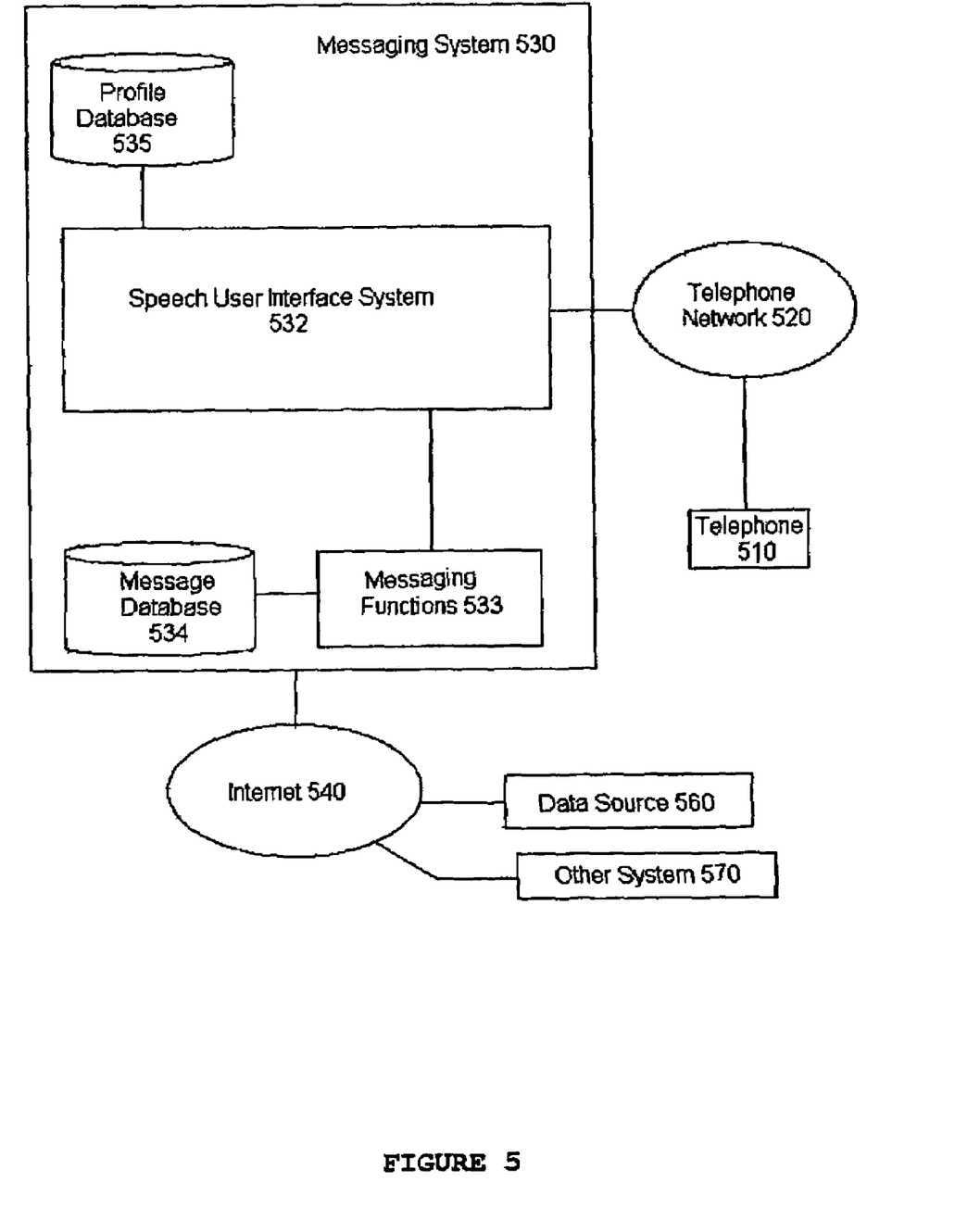
FIG. 5 illustrates a block diagram of a graphical configuration embodiment of the invention being used in a unified messaging/unified communications system.

In FIG. 5, a system is illustrated which includes an embodiment of the present invention wherein the application system is a messaging system and the user accesses the system via a telephone. The user employs telephone 510 and telephone network 520 in order to gain access to messaging system 530. The messaging system comprises a speech user interface sub-system 532 that is in communication with profile database 535. The speech user interface sub-system 532 employs the user's authentication information in order to select the user's customized profile from the profile database 535 in order to present the user with the customized summary and customized menu structure. The speech user interface sub-system 532 interprets the user's commands and is in communication with messaging functions 533 in order to execute any functions that the user may select. If the selected function pertains to the user's messages, the messaging functions 533 may access the user's messages from within message database 534. The messaging functions 533 may also employ a connection to internet 540 in order to perform any "external" functions which may have been defined by the user using the graphical configuration component of the invention. The necessary information may have to be gleaned from data source 560 or from other system 570.

Figure 6:
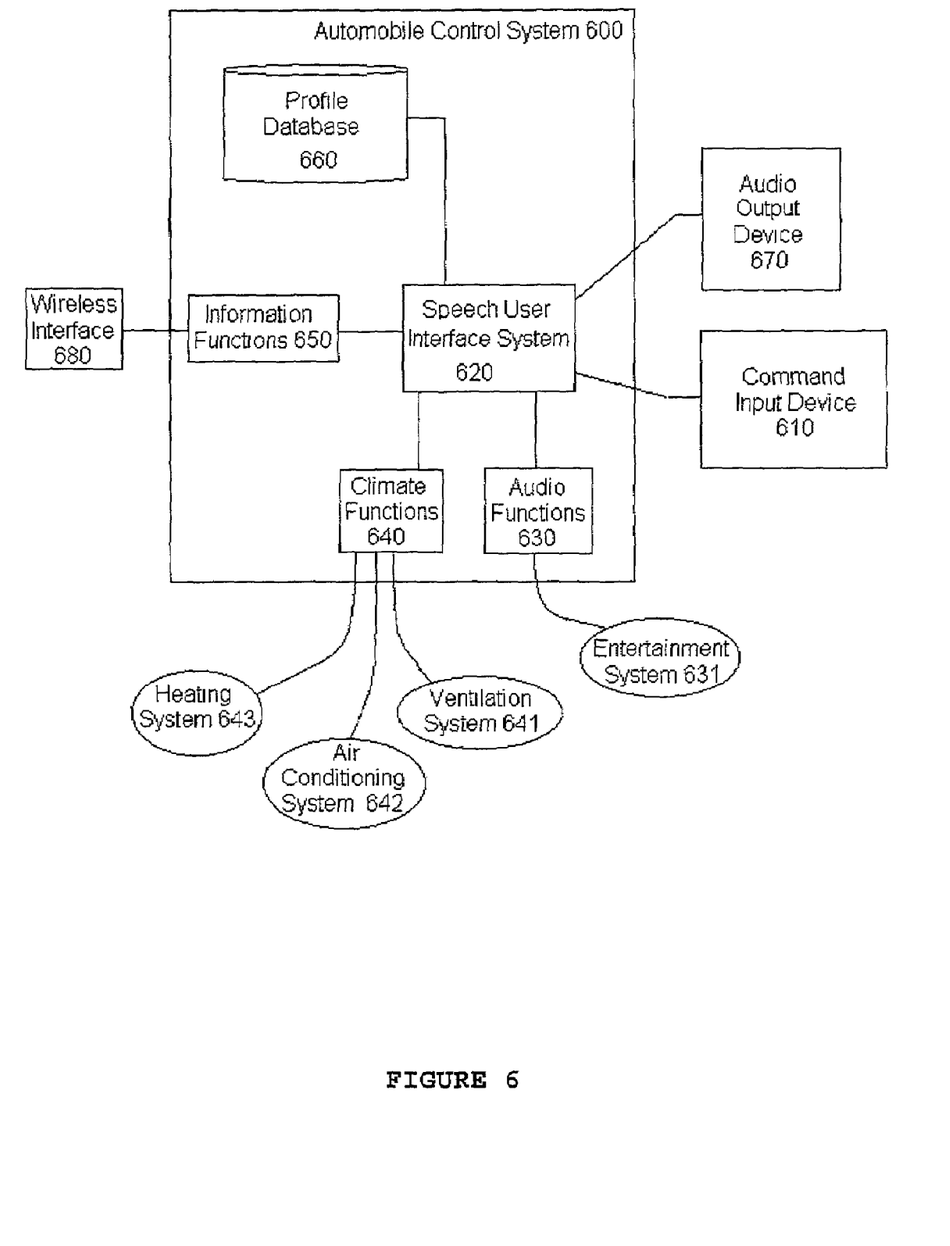
FIG. 6 illustrates a block diagram of a run-time embodiment of the invention to be used in an automobile.

FIG. 6 illustrates a system according to the present invention that has been tailored for use in an automobile. Automobile control system 600 is the specific embodiment of a generic application system. The user employs command input device 610 to access the automobile control system 600 and the information contained therein. In a preferred embodiment, the command input device 610 is a microphone that is preferably mounted in a suitable location in the automobile. Speech user interface sub-system 620 is in communication with profile database 660. The speech user interface sub-system 620 employs the user's authentication information in order to select the user's customized profile from the profile database 660 in order to present the user with the customized summary and customized menu structure. This automatic selection could, for instance, be based on authentication information contained in a key with which the user attempts to start the automobile's ignition system. In other embodiments, automatic profile selection may occur if there is only one profile in the database, or the user may perform a manual profile selection. In this automobile-based embodiment, different profiles may be created for different drivers of a vehicle such that each driver may have their customized settings available at any time. The speech user interface sub-system 620 is also in communication with audio functions 630, climate functions 640 and information functions 650. The audio functions are in communication with entertainment system 631, whereas the climate functions 640 are in communication with ventilation system 641, air conditioning system 642 and heating system 643. The information functions 650 are in communication with the internet via wireless interface 680 in order to perform any "external" functions which may have been defined by the user using the graphical configuration component of the invention. In this embodiment, in addition to the external functions mentioned previously, a driver may be particularly interested in obtaining information relating to traffic conditions, weather, road construction, etc. The output of any of these functions is communicated to the user via audio output device 670. In a preferred embodiment, the audio output device 670 may be integrated into the factory-installed audio/stereo system such that additional speakers will not need to be installed.

It is to be understood that the automobile embodiment in FIG. 6 is only exemplary, and that there are many alternative embodiments. For example, consider the case where the automobile control system 600 is replaced with a unified communications system. In this case, the wireless interface 680 may be used in order to provide unified audio entertainment (music, news, etc.) to a user over an Internet Protocol (IP) connection. The unified communications system may be disposed in an automobile or in a portable entertainment unit, such as a personal digital assistant, mobile telephone, media player, etc.

We claim:

1. A method of customizing a speech based user interface to an application system by means of an input device, said application system comprising a speech user interface subsystem, a profile database, and application components, the method comprising the steps of:
   accessing the speech user interface subsystem from an input device;
      selecting a profile of user-defined functions from the profile database for customization of said profile by a user;
      customizing the user-defined functions that are presented to the user for use within said profile;
      specifying information to be presented to the user in a status summary associated with said profile in addition to said user-defined functions;
      saving said profile in said profile database of said application system; and
      providing said profile to said speech based user interface for presentation upon subsequent access by the user.

2. A method according to claim 1 wherein said step of customizing comprises customizing a command menu structure in a dual tone multi frequency driven user interface.

3. A method according to claim 1 wherein said step of customizing comprises specifying a vocabulary structure in a speech recognition driven user interface.

4. A method according to claim 1 wherein said step of customizing comprises creating an additional function that accesses elements external to said application system.

5. The method as claimed in claim 1 wherein said step of selecting a profile is performed automatically.

6. The method as claimed in claim 1 wherein said customizing step comprises selecting functions from a menu.

7. The method as claimed in claim 6 wherein said selecting functions step comprises selecting the order selected functions are presented.

8. The method according to claim 1 further including a step of creating an additional function providing information or entertainment services from elements external to said application system.

9. The method according to claim 1 wherein a portion of said information is obtained by accessing at least one element external to said application system.

10. A method of providing a customized speech based user interface to an application system, said application system comprising a speech user interface subsystem, a profile database, and application components, the method comprising the steps of:
   receiving an access request from a user;
   retrieving a customized profile for the user from said database, said customized profile comprising user-defined functions made available to the user, said customized profile previously customized by said user;
   retrieving a customized status summary associated with said profile;
   presenting said user-defined functions via said customized speech based user interface in accordance with said customized profile; and
   presenting said customized status summary in addition to said user-defined functions via said customized speech based user interface in accordance with said customized profile.

11. A method according to claim 10 wherein said user-defined functions comprise a command menu structure in a dual tone multi frequency driven user interface.

12. A method according to claim 10 wherein said user-defined functions comprise a vocabulary structure in a speech recognition driven user interface.

13. A method according to claim 10 wherein said user-defined functions comprise additional functions that access elements external to said application system.

14. The method according to claim 10 wherein a portion of the customizable status summary is obtained by accessing at least one element external to said application system.

15. A communication system comprising:
   an input device;
   an application system including:
      a profile database comprising a plurality of profiles, each profile having user-defined functions of a speech-based user interface associated with said profile and customizable status summaries associated with said profile in addition to the user-defined functions, the profile database for use with said application system;
      customization means permitting customization of said user-defined functions and permitting the customization of said customizable status summaries; and
      a speech user interface subsystem for presentation of one of said plurality of profiles; and an audio output device.

16. A communication system according to claim 15 wherein said application system is a unified communications system.

17. A communication system according to claim 15 wherein said application system is a unified messaging system.

18. A communication system according to claim 17 wherein said user defined functions comprise messaging system functions.

19. The system as claimed in claim 15 wherein said application system comprises an automobile control system, and said user defined functions comprise automobile system functions.

20. The system as claimed in claim 15 wherein said application system is located remote from a user and further comprising a network interface for communication between said application system and said user.

21. The system according to claim 15 wherein a portion of at least one of the customizable status summaries is obtained by accessing at least one element external to said application system.

* * * * *